US008595719B2

(12) United States Patent
Asai

(10) Patent No.: US 8,595,719 B2
(45) Date of Patent: Nov. 26, 2013

(54) COMPUTER READABLE STORAGE MEDIUM STORING SECURE PRINTING SET-UP PROGRAM AND METHOD OF SETTING SECURE PRINTING

(75) Inventor: Norihiko Asai, Tajimi (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 343 days.

(21) Appl. No.: 12/862,201

(22) Filed: Aug. 24, 2010

(65) Prior Publication Data

US 2011/0078677 A1 Mar. 31, 2011

(30) Foreign Application Priority Data

Sep. 30, 2009 (JP) ................................. 2009-228656

(51) Int. Cl.
*G06F 9/445* (2006.01)
(52) U.S. Cl.
USPC .......................................... 717/176; 358/1.15
(58) Field of Classification Search
USPC .......................................................... 717/176
See application file for complete search history.

(56) References Cited

U.S. PATENT DOCUMENTS

| | | | | |
|---|---|---|---|---|
| 6,762,771 B1 * | 7/2004 | Niki et al. | ...................... | 715/700 |
| 6,959,437 B2 * | 10/2005 | Schacht et al. | ................. | 719/321 |
| 7,383,554 B2 * | 6/2008 | Ozaki et al. | .................... | 719/327 |
| 7,506,142 B2 | 3/2009 | Yoshimura et al. | | |
| 8,185,887 B2 * | 5/2012 | Hattori | ........................... | 717/174 |
| 2004/0057072 A1 * | 3/2004 | Borchers et al. | ............... | 358/1.15 |
| 2005/0243153 A1 * | 11/2005 | Takahashi | ...................... | 347/101 |
| 2005/0275862 A1 * | 12/2005 | Matsumoto et al. | .......... | 358/1.13 |
| 2006/0037029 A1 * | 2/2006 | Yamada | ......................... | 719/327 |
| 2006/0132842 A1 * | 6/2006 | Nakamura | .................... | 358/1.15 |
| 2006/0230261 A1 | 10/2006 | Yoshimura et al. | | |
| 2009/0086246 A1 | 4/2009 | Asai | | |

FOREIGN PATENT DOCUMENTS

| | | |
|---|---|---|
| JP | 2006-092373 | 4/2006 |
| JP | 2006-164042 | 6/2006 |
| JP | 2006-293771 | 10/2006 |
| JP | 2007-306398 | 11/2007 |
| JP | 2009-86905 | 4/2009 |

OTHER PUBLICATIONS

Decision to Grant dated Aug. 11, 2011 received from the Japanese Patent Office from related Japanese Application No. 2009-228656, together with an English-language translation.
Chinese Office Action dated Jan. 31, 2013 from related application CN 201010502672.4 together with an English language translation.
Chinese Office Action dated Sep. 3, 2013 from related application CN 201010502672.4.

* cited by examiner

*Primary Examiner* — Jacob C. Coppola
(74) *Attorney, Agent, or Firm* — Scully, Scott, Murphy & Presser, P.C.

(57) ABSTRACT

There is provided a non-transitory storage medium that stores a secure printing set-up program executable on an image processing device connectable to an image forming device. The secure printing set-up program includes a set of program instructions including: obtaining other user information indicative of whether there is any other user that is able to use the image forming device; and installing a driver with such a default setting that the image forming device operates in either one of a secure mode and a normal mode, the secure mode being such that the image forming device forms images when a user of the information processing device is authenticated, the normal mode being such that the image forming device forms images without authenticating the user of the information processing device, the default setting being configured to be selected between the secure mode and the normal mode depending on the other user information.

16 Claims, 7 Drawing Sheets

FIG. 3

PRINTER DRIVER SETTING FOR SECURE PRINTING

A NEW USER IS REGISTERED IN DEVICE ABC-10000 YOU USE.
YOU ARE RECOMMENDED TO ACTIVATE SECURE PRINTING.

● SELECT TO ACTIVATE SECURE PRINTING

PASS WORD:

○ SELECT NOT TO ACTIVATE SECURE PRINTING

OK

COMPUTER READABLE STORAGE MEDIUM STORING SECURE PRINTING SET-UP PROGRAM AND METHOD OF SETTING SECURE PRINTING

CROSS REFERENCE TO RELATED APPLICATION

This application claims priority from Japanese Patent Application No. 2009-228656 filed Sep. 30, 2009. The entire content of the priority application is incorporated herein by reference.

TECHNICAL FIELD

The present invention relates to a non-transitory computer readable storage medium storing a secure printing set-up program, according to which an information processing device such as a personal computer controls a printer to execute secure printing. The present invention also relates to a method of setting secure printing.

BACKGROUND

Secure printing has been widely known to protect confidential information from tampering and inappropriate distribution under network printer environment. In such conventional secure printing, upon installation of a printer driver for a particular printer, the secure printing is first activated and the installation is then to be executed on a computer when the printer is connected to a network.

SUMMARY

Confidential information needs to be inputted at the time of printing once the secure printing has been set. A user is required to input passwords or the like on the printer each time he carries out printing, even if no one else other than this user uses the printer on the network (i.e., even if nobody may possibly see what was printed nor take the same away from the printer). Therefore, with the above-described conventional configuration, user's operability at the time of printing is held down excessively low.

In view of the foregoing, it is an object of the present invention to provide a non-transitory computer readable storage medium storing a secure printing set-up program and a method of setting secure printing which enables confidentiality and operability to be compromised at the time of printing.

In order to attain the above and other objects, there is provided a non-transitory storage medium that stores a secure printing set-up program executable on an image processing device connectable to an image forming device. The secure printing set-up program includes a set of program instructions including: obtaining other user information indicative of whether there is any other user that is able to use the image forming device; and installing a driver with such a default setting that the image forming device operates in either one of a secure mode and a normal mode, the secure mode being such that the image forming device forms images when a user of the information processing device is authenticated, the normal mode being such that the image forming device forms images without authenticating the user of the information processing device, the default setting being configured to be selected between the secure mode and the normal mode depending on the other user information.

According to another aspect, there is provided a method of determining a setting for executing secure printing in an information processing device. The method includes: obtaining other user information indicative of whether there is any other user that is able to use an image forming device; and installing a driver with such a default setting that the image forming device operates in either one of the secure mode and the normal mode, the secure mode being such that the image forming device forms images when a user of the information processing device is authenticated, the normal mode being such that the image forming device forms images without authenticating the user of the information processing device, the default setting being configured to be selected between the secure mode and the normal mode depending on the other user information.

BRIEF DESCRIPTION OF THE DRAWINGS

In the drawings:

FIG. 3 is an example of a secure printing set-up screen that appears on a display unit of the personal computer according to the present embodiment;

DETAILED DESCRIPTION

Figure 1:
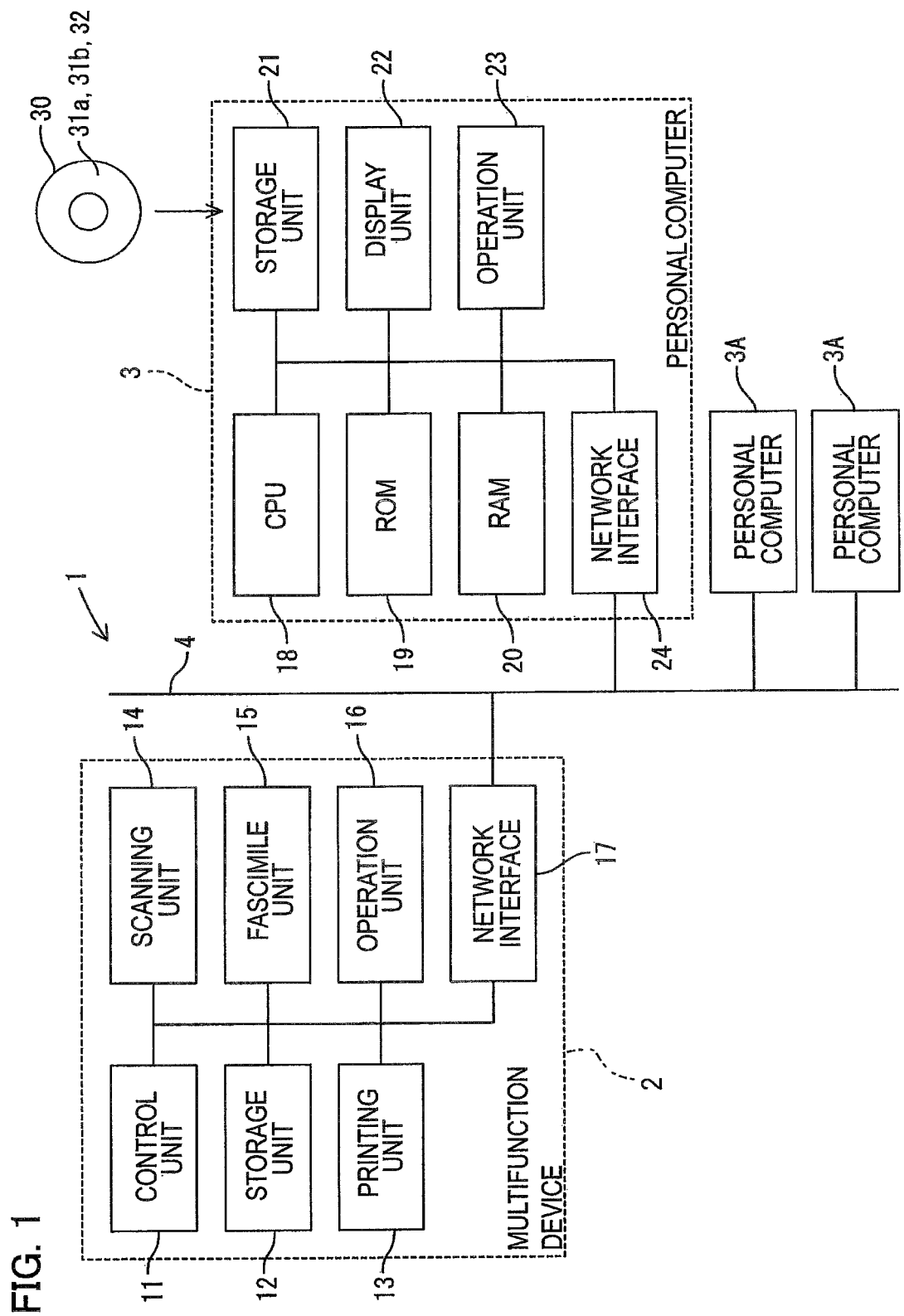
FIG. 1 is a block diagram illustrating a configuration of a printing system according to an embodiment of the present invention.

First, a general configuration of a printing system 1 according to an embodiment of the present invention will be described with reference to FIG. 1.

The printing system 1 is configured of a multifunction device 2 (will be referred to as "MFD 2"), at least one personal computer 3 (will be referred to as "PC 3") and a telecommunication line 4 such as LAN. In FIG. 1, three personal computers (the PC 3 and other two PCs 3A) are depicted. In the following description, explanations will be given, assuming that a secure printing program according to the present embodiment is to be installed on the PC 3.

The MFD 2 is provided with various functions, including a printer function, a scanner function, a copier function and a facsimile function. As shown in FIG. 1, the MFD 2 includes a control unit 11, a storage unit 12, a printing unit 13, a scanning unit 14, a facsimile unit 15, an operation unit 16, and a network interface 17.

The control unit 11 includes a CPU, a ROM and a RAM (not shown).

The CPU controls each unit of the MFD 2 by executing various programs stored in the ROM. The ROM stores various programs that the CPU executes and related data. The RAM serves as a main storage area that is used when the CPU executes various processing.

For example, the ROM stores a printing program for enabling the printing unit 13 to carry out image forming operations. The control unit 11 determines an operation mode in which each image forming operation is carried out in accordance with print data obtained from the PCs 3 and 3A. The printing unit 13 forms images on recording medium based on the print data in the operation mode determined by the control unit 11.

In the present embodiment, the MFD 2 is selectively operable in at least a normal mode and a secure mode for executing image forming operations on the recording medium. In the normal mode, the MFD 2 performs the image forming operations without authenticating respective users of the PCs 3 and 3A (senders of the print data) upon receipt of the print data from the PCs 3 and 3A via the network interface 17. In the secure mode, when obtaining the print data via the network interface 17, the MFD 2 starts the image forming operations after the senders of the print data are authenticated.

Further, in the present embodiment, when the user of the PC 3 installs a printer driver of the MFD 2, the MFD 2 is requested to register the user of the PC 3 as a new user of the MFD 2. Upon receipt of this request, the control unit 11 of the MFD 2 stores information indicating that the PC 3 has installed the printer driver of the MFD 2 (to be referred to as "installation information") in a prescribed region of the storage unit 12, registering the installation information of the PC 3. At this time, the control unit 11 of the MFD 2 determines whether any other installation information (information indicating that any other PC 3A has installed the printer driver of the MFD 2 thereon) has been registered. If any other PC 3A has already been registered as a user of the MFD 2, the control unit 11 informs the PC 3A (existing user) that the PC 3 has now been registered as a new share user of the MFD 2. Such information on new share user registration may not necessarily be notified to the existing users. Details of the installation process will be described later.

The storage unit 12 is an external storage device that stores various data, and is configured of non-volatile recording media (hard disk or Flash memory, for example). The storage unit 12 stores print requests and information on secure printing transmitted from the PC 3.

The printing unit 13 forms images on recoding media, such as sheets of paper, based on page data, using a laser or an ink-jet system.

The scanning unit 14 includes a light source and a line sensor or the like. The line sensor reads documents based on the light irradiated by the light source and reflected from the document, and generates image data.

The facsimile unit 15 is connected to a switch-board via telephone lines. The facsimile unit 15 exchanges facsimile data with external facsimile devices in accordance with a prescribed protocol.

The operation unit 16 includes a plurality of buttons and a liquid crystal display. The user can manipulate the buttons while referring to a screen displayed on the liquid crystal display, thereby inputting various operations.

The network interface 17 is connected to external devices, such as the PCs 3 and 3A, via the telecommunication lines 4.

The PC 3 includes a CPU 18, a ROM 19, a RAM 20, a storage unit 21, a display unit 22, an operation unit 23 and a network interface 24.

The CPU 18 executes various programs stored in the ROM 19 and controls operations of each unit of the PC 3. The ROM 19 stores various programs that the CPU 18 executes and related data. The RAM 20 is a main storage area that is used when the CPU 18 executes various processing.

The storage unit 21 is an external storage device that stores various programs and data. The storage unit 21 is configured of non-volatile recording media (such as hard disk, or Flash memory). In the present embodiment, the storage unit 21 stores a device driver 31a, a device driver 31b and an install program 32 that were stored on a CD-ROM 30. In the present embodiment, the device driver 31a is a printer driver for enabling the PC 3 to control the MFD 2 over a network (the telecommunication line 4). The device driver 31b is a printer driver for allowing the PC 3 to locally control the MFD 2. The install program 32 initiates installation of either the device driver.

The display unit 22 includes a display device such as a liquid crystal display. The operation unit 23 includes a mouse and a keyboard. The network interface 24 is connected to external devices such as the MFD 2 and other PC 3A via the telecommunication lines 4.

In the PC 3 having the above-described configuration, when the user selects 'print' on an application software such as a word processor, the CPU 18 executes the device driver 31a or 31b and displays a print set-up window (not shown), whereby the user can input a print command. Upon receipt of the print command from the user, the CPU 18 transmits the print command to the MFD 2 via the network interface 24. When the network interface 17 of the MFD 2 receives the print command from the PC 3, the print command is inputted to the MFD 2.

In the above-described process, if the user of the PC 3 wishes to perform secure printing so that other users of the MFD 2 cannot see what he printed, the user of the PC 3 sets the secure printing in the print set-up window and inputs a print password. In this case, the PC 3 transmits, to the MFD 2, information on the secure printing and the print password along with the print command and the print data. Upon receipt of the information on the secure printing, the MFD 2 carries out user authentication before actually printing the transmitted print data. The MFD 2 prompts inputting a print password identical to the print password transmitted from the PC 3 together with the print data. When the user of the PC 3 (sender of the print data and the print password) inputs the print password on the operation unit 16 of the MFD 2, the MFD 2 compares the inputted print password with the print password transmitted from the PC 3. Upon confirming that these two print passwords are identical to each other, the MFD 2 determines that the user authentication is successful (i.e., the current user of the MFD 2 is the sender of the print data) and starts to print the print data received from the PC 3.

Next, a device driver installation process executed by the CPU 18 of the PC 3 will be described with reference to a flowchart of FIG. 2.

In the present embodiment, installation of a network driver (i.e., device driver 31a) includes the following well-known features. Set-up files to which the PC 3 refers when controlling printing operations of the MFD 2 are created within the PC 3. Then the created set-up files and driver configuration files, which are included in the device driver 31a for controlling the MFD 2, are stored in a predetermined location of the storage unit 21 of the PC 3 (for example, in a system folder). Concurrently, device information is registered in registries within the storage unit 21. The device information indicates correlationships between the MFD 2 and these files (the set-up files and driver configuration files), such as where the MFD 2 should ask for a certain file in the set-up files and in the driver configuration files. In this way, in the present embodiment, installation of a network driver not only includes storage of a driver program of the network driver in a storage device of an information processing device, but also initialization of prescribed files in the driver program.

As an overview, in the device driver installation process of the present embodiment, the CPU 18 of the PC 3 first obtains other user information from the MFD 2. The other user information indicates whether any other user is allowed to use the MFD 2. When the other user information indicates that some other user can use the MFD 2, the CPU 18 starts to install the device driver 31a on the PC 3 with such a default that the MFD 2 should operate in the secure mode. On the other hand, if the other user information indicates that no one else can use the MFD 2, the CPU 18 starts installing the device driver 31a on the PC 3 with such a default that the MFD 2 should operate in the normal mode.

Figure 2:
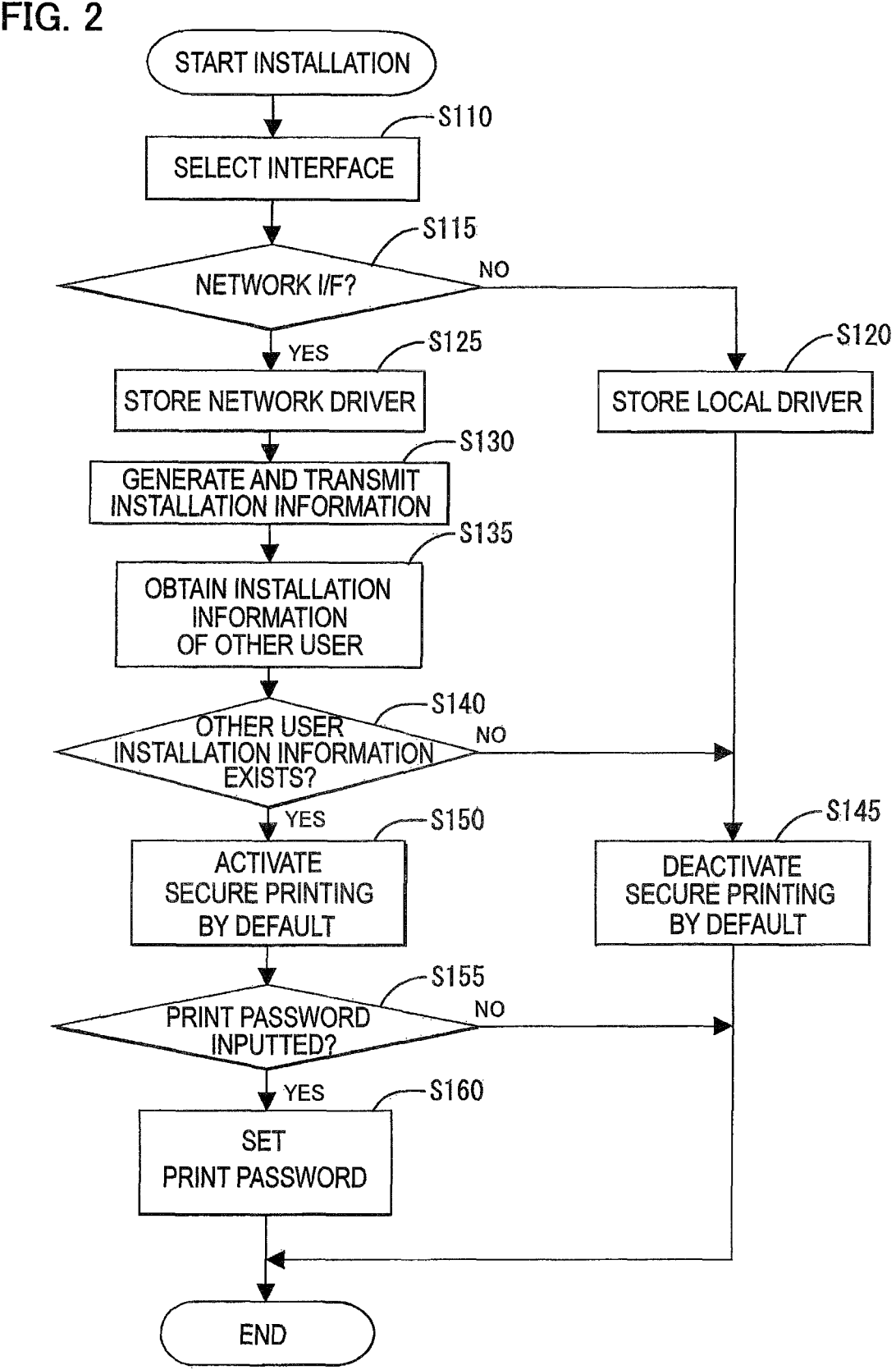
FIG. 2 is a flowchart of a device driver installation process of a secure printing set-up program executed by a personal computer according to the present embodiment.

Referring to FIG. 2, the device driver installation process is described. The device driver installation process is configured to be executed when the CD-ROM 30 is inserted in a data reading device (not shown) of the PC 3. Upon loading of the CD-ROM 30, the CPU 18 retrieves the install program 32 stored on the CD-ROM 30 and executes the device driver installation process in accordance with the install program 32.

Upon starting the device driver installation process, in S110 the CPU 18 prompts the user of the PC 3, via the display unit 22, to select connection status between the MFD 2 and the PC 3. In other words, the user is asked to select an interface based on how the PC 3 is connected to the MFD 2. When the PC 3 is connected to the MFD 2 via LAN, the user selects a network interface, but if the PC 3 is connected locally via a USB cable, a local interface should be selected.

When accepting user's input, in S115 the CPU 18 determines which interface has been selected by the user.

If the local interface is selected (S115:NO), in S120 the CPU 18 retrieves the device driver 31b from the CD-ROM 30 and stores the device driver 31b in the storage unit 21. In this case, in S145 the CPU 18 sets, as an initial setting, the secure printing to OFF, and ends the device driver installation process. In the present embodiment, the secure printing is configured not to be activated by default in case of local connection, because there is a low possibility that the secure printing is required. The initial setting on whether the secure printing should be activated is stored in a prescribed region of the set-up files stored in the storage unit 21.

On the other hand, when the network interface is selected (S115:YES), in S125 the CPU 18 retrieves the device driver 31a from the CD-ROM 30 and stores the device driver 31a in the storage unit 21. In S130, the CPU 18 generates the installation information indicating that the device driver 31a has been installed on the PC 3. The installation information is generated using, for example, a user name, a PC name or a TCP/IP address. Then the generated installation information is transmitted to the MFD 2 so that the MFD 2 can store the same for registering the PC 3 as a new user of the MFD 2.

In S135 the CPU 18 obtains the installation information of other user from the MFD 2. That is, the CPU 18 asks the MFD 2 whether there is any other PC 3A on which the device driver 31a has already been installed. Alternatively, such installation information of other user may be obtained simply by accessing the MFD 2. In this way, in the present embodiment, the PC 3 is notified of the other user's installation information from the MFD 2 in response to the registration request of the PC 3.

The installation information generated in S130 is used as an example of the other user information in the present embodiment. Specifically, the existence of the installation information of other user means that there exists any other user who is entitled to use the MFD 2, as described below.

In S140 the CPU 18 determines whether any other user can use the MFD 2 based on the other user's installation information obtained from the MFD 2.

If no other user's installation information is available, i.e., if there is no other user who has already installed the device driver 31a thereon (S140:NO), in S145 the CPU 18 sets the secure printing to OFF by default (i.e., the MFD 2 will operate in the normal mode), and ends the device driver installation process. In this way, the secure printing is configured not to be activated even in case of network connection if no one else has registered his installation information in the MFD 2, since there is less likelihood that somebody else would see what the user of the PC 3 has printed.

On the other hand, if there exists the installation information of other user in the MFD 2, meaning that any other user has already installed the device driver 31a on the PC 3A (S140: YES), in S150 the CPU 18 sets the secure printing to ON by default. That is, the MFD 2 is here configured to operate in the secure mode.

The print password is necessary for carrying out the secure printing. In S155 the CPU 18 automatically displays a screen (a secure printing set-up screen such as that shown in FIG. 3) on the display unit 22 for prompting the user to input the print password. The user inputs the print password in a password entry field of the secure printing set-up screen shown on the display unit 22. On this secure printing set-up screen, the user may also switch the default setting on the secure printing from ON to OFF and vice versa after the initial setting was set.

In this way, the print password has been set at the time of installation of the device driver 31a. Therefore, the user of the PC 3 is not required to manually display the secure printing set-up screen for inputting the print password each time he executes the secure printing.

When the user has inputted the print password on the operation unit 23 (S155:YES), in S160 the CPU 18 stores the inputted print password in a prescribed region of the storage unit 21. When the print password has been set in S160, the CPU 18 ends the device driver installation process.

The print password is to be transmitted, as header information of the print data, to the MFD 2 along with the user ID and information indicative of the need of the secure printing (the secure mode) when the user of the PC 3 carries out printing. Upon receipt of the print password, the MFD 2 compares the transmitted print password with the print password inputted by the user of the MFD 2 from the operation unit 16, thereby authenticating the user. The MFD 2 starts printing the print data only when the user is authenticated. When the print data is transmitted to the MFD 2, the CPU 18 may generate the information on the secure printing in a form of an operation flag.

If in S155 the user does not input the print password (S155: NO), the CPU 18 ends the device driver installation process without setting the print password.

As described, in the present embodiment, if the installation information of other user has already been registered in the MFD 2 at the time of installation of the device driver 31a on the PC 3, the secure printing is configured to be activated in the PC 3 as a default setting so that the MFD 2 can operate in the secure mode. Therefore, even when the need for the secure printing is high (i.e., even when any other user may possibly use the MFD 2 as well), the user of the PC 3 does not necessarily have to set the secure printing each time he performs printing operations. On the other hand, when the installation information of other user is not available, there is less likelihood that the secure printing would be required since no other user may use the MFD 2. With the above-described configuration, the user of the PC 3 does not have to manually deactivate the secure printing each time he performs printing operations, thereby enabling the user to omit unnecessary user authentication operations. In this way, the present embodiment can achieve a good balance between confidentiality and operability at the time of printing.

While the present invention has been described in detail with reference to the specific embodiment thereof, it would be apparent to those skilled in the art that various changes and modifications may be made therein without departing from the spirit of the invention.

For example, in the printing system 1 according to the present embodiment, the secure printing may be configured to be activated as a default setting unless the other user information proves that the user of the PC 3A cannot use the MFD 2. This is because the secure printing is effective as long as there is a possibility that the user of the other PC 3A may also use the MFD 2 for printing. Alternatively, the secure printing may be configured to be deactivated as a default setting when the other user information shows that other user cannot use the MFD 2. This is because there is no need to perform the secure printing when no other user can use the MFD 2.

Further, in the device driver installation process according to the present embodiment, the CPU 18 makes a YES determination in S140 when the installation information of other user is obtained from the MFD 2. With this configuration, however, there is a possibility that the CPU 18 also determines YES in S140 in case that the user of the PC 3 is identical to the user of the PC 3A. To this effect, instead, the CPU 18 may be configured to make a decision in S140 based on the availability of the installation information of other user and the user name contained in the obtained installation information. More specifically, the CPU 18 may make a determination in S140 that there is any other user that is allowed to use the MFD 2 when the installation information of the PC 3A has already been registered in the MFD 2 and the obtained installation information indicates the user name thereof is different from the user name of the PC 3.

Still alternatively, between S140 and S150 of the device driver installation process in FIG. 2, the CPU 18 may display the secure printing set-up screen (see FIG. 3) on the display unit 22 so that the user of the PC 3 can confirm whether the secure printing should be set as a default setting. With this configuration, even though there exists the installation information of other user (the other user information is registered) in the MFD 2, the user of the PC 3 is allowed to have an option not to activate the secure printing as a default setting when the secure printing is not necessarily to be executed.

Figure 4:
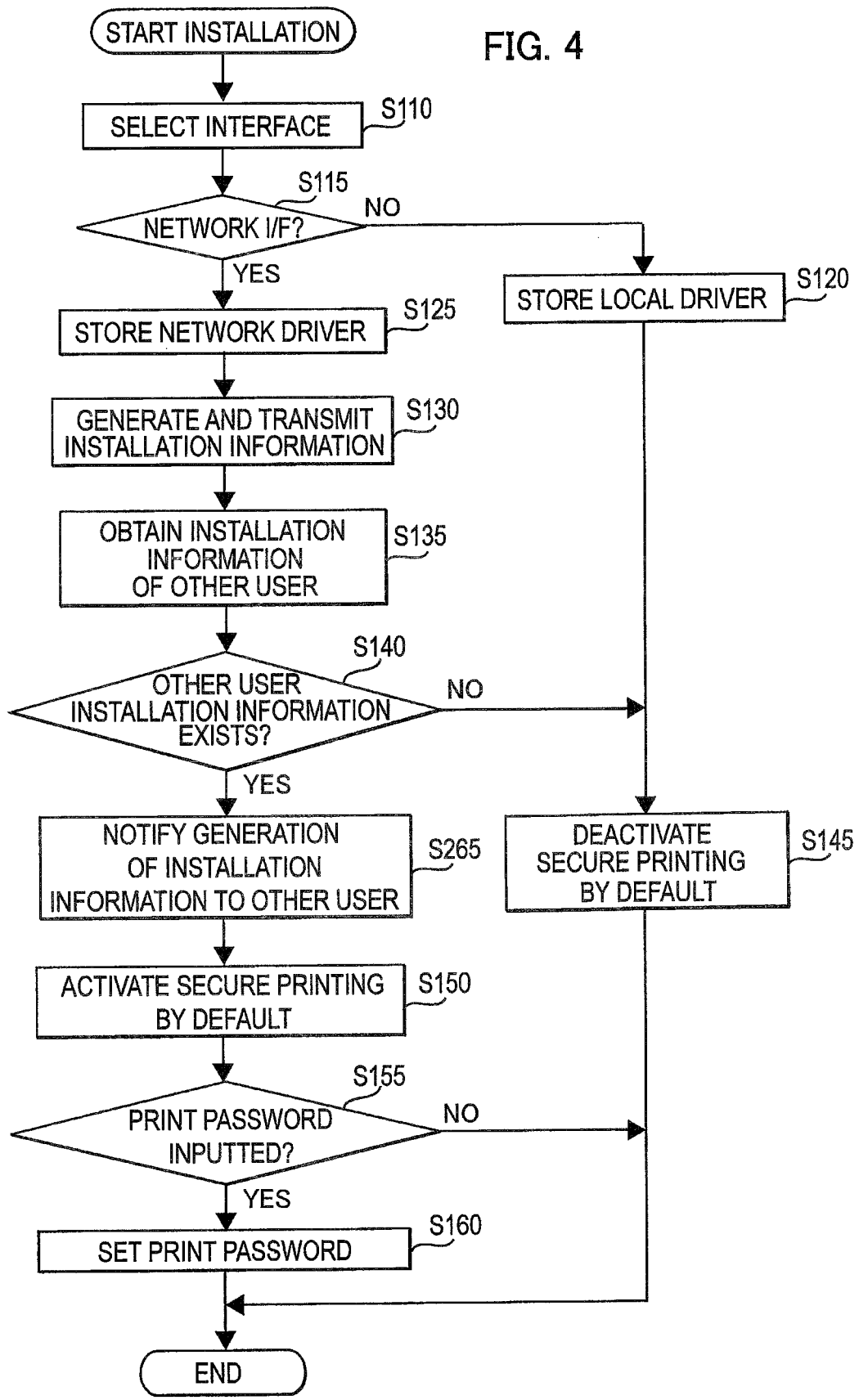
FIG. 4 is a flowchart of a device driver installation process according to a first modification to the present embodiment.

Further, FIG. 4 shows a device driver installation process according to a first modification. In FIG. 4, the steps designated with the same reference numerals as those in FIG. 2 are identical to the steps of the present embodiment. In the first modification, when installing the device driver 31a, the PC 3 may inform the other PC 3A that the installation information of the device driver 31a has been generated in the PC 3 (S265). In this way, the PC 3 can notify other users on the network that the PC 3 will also use the MFD 2 from now on.

Figure 5:
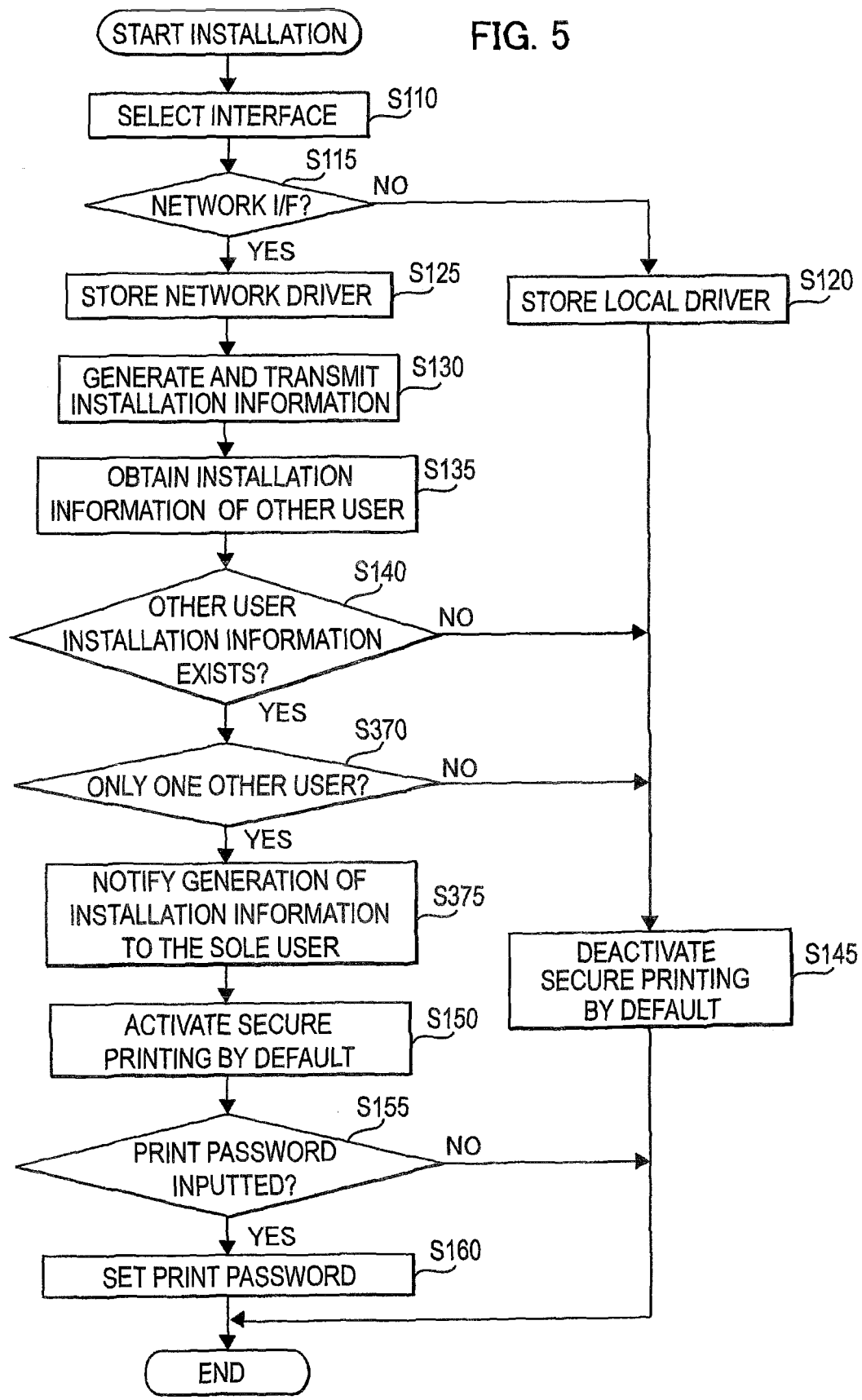
FIG. 5 is a flowchart of a device driver installation process according to a second modification to the present embodiment.

Further, FIG. 5 shows a device driver installation process according to a second modification. In FIG. 5 as well, the steps designated with the same reference numerals as those in FIG. 2 are identical to the steps of the present embodiment. In the second modification, the user of the other PC 3A is notified of the PC 3's generation of the installation information in S375 if the PC 3A has been the sole user of the MFD 2 at the time of generation of the new installation information (S370: YES). For the user of the PC 3A who has enjoyed exclusive use of the MFD 2, addition of other user to the MFD 2 has a significant impact in terms of confidentiality of information. The notification of an additional user at the time of his installation enables the user of the PC 3A (existing user) to be readily informed about the need for switching to the secure printing.

Figure 6:
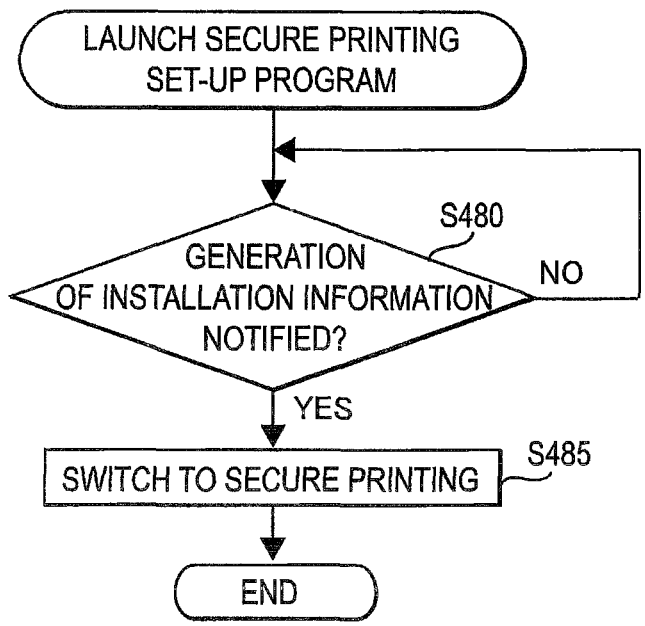
FIG. 6 is a flowchart of a secure printing set-up program according to a variation of the present embodiment.

When notified of the new generation of the installation information, the PC 3A (existing user) may also receive the installation information so that the PC 3A can switch to the secure printing. More specifically, as shown in FIG. 6, in response to the notification of the generation of the new installation information made in S265 of FIG. 4 or in S375 of FIG. 5, when the installation information is generated and notified by the PC 3 (S480:YES), the PC 3A may be so configured as to receive the newly-created installation information, and, when received, the PC 3A may activate the secure mode to perform the secure printing in S485. Such switching to the secure mode may be done automatically or by displaying the secure printing set-up screen (see FIG. 3) on the display unit 22, whereby the user can select the secure mode. With this configuration, the user of the PC 3A can maintain the confidentiality of information even if a new PC (the PC 3) is registered as a new share user of the MFD 2.

Figure 7:
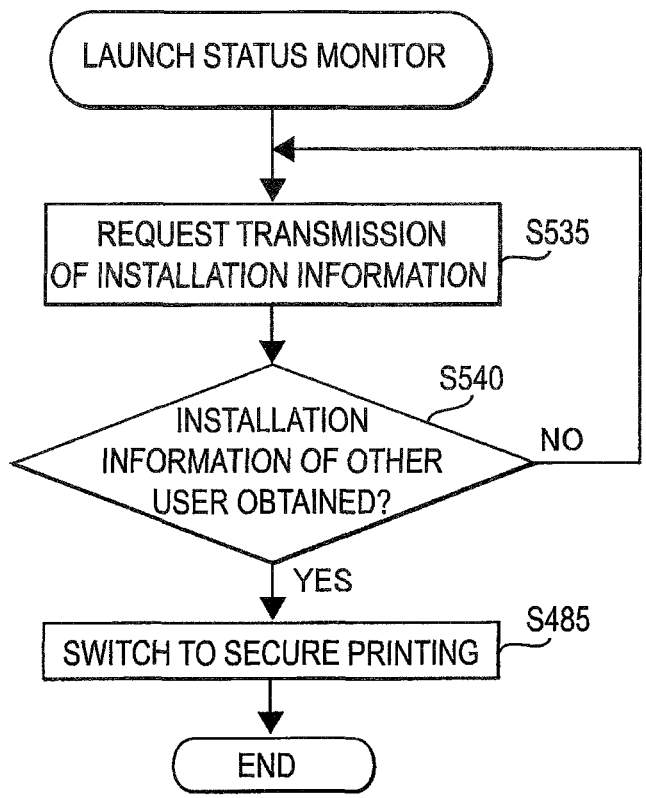
FIG. 7 is a flowchart showing operations of a status monitor included in a secure printing set-up program according to another variation of the present embodiment.

Still further, the secure printing set-up program may include a status monitor. The status monitor is a program for obtaining information indicative of status of other devices connected to the same network as the PC 3 (status information). The status monitor may be configured to be installed concurrently at the time of installation of the device driver 31a. The status monitor periodically asks other devices (the MFD 2 and/or the PC 3A) for the status information, such as how much toner remains and whether recording media is available, and displays the obtained status information on the display unit 22 of the PC 3. In case that the status monitor has been installed on the PC 3, the installation information of other user may be obtained directly from the PC 3A, not from the MFD 2. More specifically, as shown in FIG. 7, the status monitor of the PC 3 outputs a request for transmitting the installation information of the PC 3A directly to the status monitor installed on the PC 3A (S535). As a response, the status monitor on the PC 3A refers to the installation information on the device driver 31a stored in the registry or the set-up files, and transmits the same to the PC 3 (S540). In this way, the status monitors of the PC 3 and the PC 3A may exchange the installation information between each other. Alternatively, each status monitor may periodically ask the MFD 2 to confirm new generation of the installation information. In either case, in response to the generation of the installation information, each status monitor may display the secure printing set-up screen (see FIG. 3) on the display unit 22 for prompting the user to select whether to activate the secure printing and to input the print password if the secure printing is selected.

Figure 8:
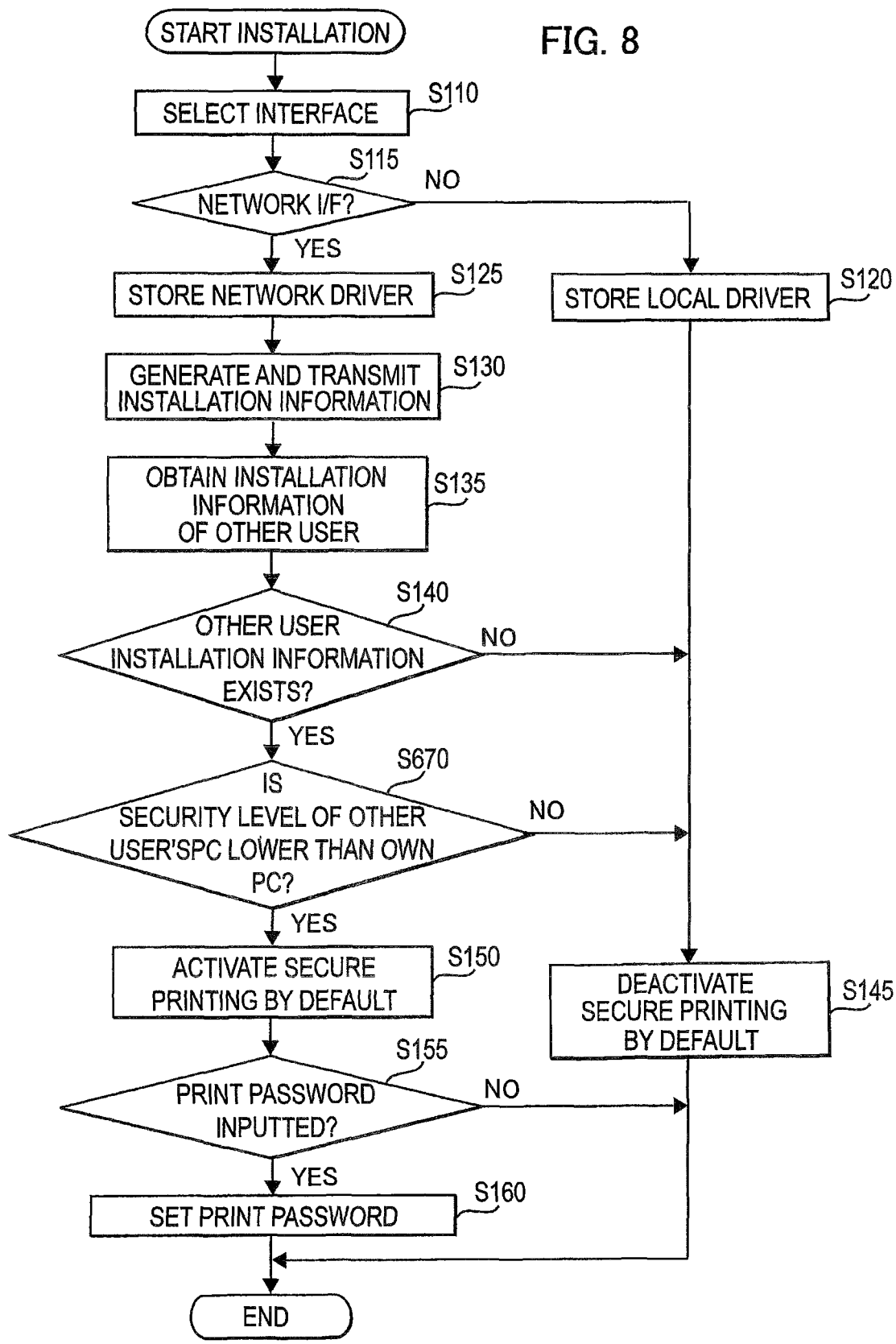
FIG. 8 is a flowchart of a device driver installation process according to a third modification to the present embodiment.

Further, FIG. 8 shows a device driver installation process according to a third modification. In FIG. 8 as well, the steps designated with the same reference numerals as those in FIG. 2 are identical to the steps of the present embodiment. In the third modification, the installation information includes a security level of each user. Suppose that the PC 3 installs the device driver 31a and obtains the installation information of the other PC 3A. At this time, if the security level of the PC 3A is lower than the security level of the PC 3 (S670:YES), the PC 3 may activate the secure mode so that the secure printing can be carried out in the MFD 2. In this way, even though a plurality of users with different security levels shares the MFD 2, the confidentiality and the operability can be maintained in a compromised manner at the time of printing.

Further, the installation information of the device driver 31a is used as the other user information in the present embodiment, but the present invention is not limited to this configuration. For example, the other user information may be information on LAN connection status of other PC 3A. Typically, when the other PC 3A is connected to the same LAN as the PC 3, the user of the PC 3A is highly likely to use the MFD 2 when printing.

Incidentally, a recent image forming device (multifunction device) has various functions, such as a copy function, a facsimile function, a scanning function and a printing function. Such an image forming device is sometimes provided with an access restriction function according to which a manager (administrator) of the image forming device can put restrictions on each user's access to various functions. When the present invention is applied to this image forming device, the other user information may include information indicating which functions each user is authorized to use, and such other user information may be transmitted from the image forming device. Still alternatively, for example, information on destinations of scanned data registered in a multifunction device may also be used as the other user information.

Further, although the present invention has been applied to a multifunction device (the MFD 2) as an example of image forming devices in the present embodiment, the present invention may also be applied to an image forming device other than a multifunction device, such as a laser printer or an LED printer. Also, the present invention may encompass an information processing device other than personal computers, such as an industrial computer for a particular use.

What is claimed is:

1. A non-transitory storage medium that stores a secure printing set-up program executable on an image processing device connectable to an image forming device via a network, the secure printing set-up program, when executed by a processor of the image processing device, causes the image processing device to perform:
   obtaining information indicative of whether more than one information processing device on the network is registered to use the image forming device on the network; and
   installing a driver with such a default setting that the image forming device operates in one of a secure mode and a normal mode, the secure mode being such that the image forming device forms images when a user of an information processing device on the network is authenticated, the normal mode being such that the image forming device forms images without authenticating the user of the information processing device on the network, the default setting being configured to be selected from one of the secure mode and the normal mode depending on the indicative information;
   when the indicative information indicates there is more than one image processing device that is registered to use the image forming device, the installing further comprises installing the driver on the information processing device with such a default setting that the image forming device operates in the secure mode; and
   when the indicative information indicates there is only one image processing device that is registered to use the image forming device, the installing further comprises installing the driver on the information processing device with such a default setting that the image forming device operates in the normal mode.

2. The storage medium according to claim 1, further comprising generating installation information when the driver is installed on the information processing device, the installation information indicating that the driver has been installed on the information processing device.

3. The storage medium according to claim 2, further comprising transmitting the installation information to the image forming device for storing the installation information in the image forming device,
   wherein the information processing device is configured to obtain the installation information of other information processing device from the image forming device, the installation information of the other information processing device being used as the indicative information, the default setting being configured to be selected from one of the secure mode and the normal mode depending on the installation information of the other information processing device.

4. The storage medium according to claim 2, further comprising notifying generation of the installation information to an other information processing device on which the driver has already been installed.

5. The storage medium according to claim 4, wherein the generation of the installation information in the image processing device is notified to the other information processing device if the other information processing device is a sole information processing device on which the driver has been installed.

6. The storage medium according to claim 5, further comprising:
   receiving the installation information of an-other information processing device when the information processing device is notified of the generation of the installation information in the other information processing device; and
   switching to the secure mode for enabling the image forming device to operate in the secure mode if the information processing device receives the installation information generated in the other information processing device when the information processing device operates in the normal mode.

7. The storage medium according to claim 2, wherein the installation information includes information about a security level of the information processing device,
   wherein the driver is configured to be installed on the information processing device with such a default setting that the image forming device operates in the secure mode when the installation information of an-other information processing device indicates that the security level of the other information processing device is lower than the security level of the information processing device.

8. The storage medium according to claim 2, wherein the secure printing set-up program further includes a status monitor that is configured to monitor a status about installation of the driver in the information processing device, the status monitor being installed on the information processing device when the driver is installed on the information processing device, the installation information of an-other information processing device being used as the indicative information and configured to be obtained from the status monitor installed on the other information processing device, the default setting being configured to be selected from one of the secure mode and the normal mode depending on the installation information of the other information processing device.

9. A method of determining a setting for executing secure printing in an information processing device connected to an image forming device via a network, the method comprising:
   obtaining, using a CPU, information indicative of whether more than one information processing device on the network is registered to use an image forming device on the network; and installing a driver with such a default setting that the image forming device operates in one of a secure mode and a normal mode, the secure mode being such that the image forming device forms images when a user of an information processing device on the network is authenticated, the normal mode being such that the image forming device forms images without authenticating the user of the information processing device on the network, the default setting being configured to be selected from one of the secure mode and the normal mode depending on the indicative information;

when the indicative information indicates there is more than one information processing device that is registered to use the image forming device, the installing further comprises installing the driver on the information processing device with such a default setting that the image forming device operates in the secure mode; and when the indicative information indicates there is only one information processing device that is registered to use the image forming device, the installing further comprises installing the driver on the information processing device with such a default setting that the image forming device operates in the normal mode.

10. The method according to claim 9, further comprising generating installation information when the driver is installed on the information processing device, the installation information indicating that the driver has been installed on the information processing device.

11. The method according to claim 10, further comprising transmitting the installation information to the image forming device for storing the installation information in the image forming device, wherein the information processing device is configured to obtain the installation information of other information processing device from the image forming device, the installation information of the other information processing device being used as the indicative information, the default setting being configured to be selected from one of the secure mode and the normal mode depending on the installation information of the other information processing device.

12. The method according to claim 10, further comprising notifying generation of the installation information to an-other information processing device on which the driver has already been installed.

13. The method according to claim 12, wherein the generation of the installation information in the information processing device is notified to the other information processing device if the other information processing device is a sole information processing device on which the driver has been installed.

14. The method according to claim 13, further comprising:

receiving the installation information of an-other information processing device when the information processing device is notified of the generation of the installation information in the other information processing device; and switching to the secure mode for enabling the image forming device to operate in the secure mode if the information processing device receives the installation information generated in the other information processing device when the information processing device operates in the normal mode.

15. The method according to claim 10, wherein the installation information includes information about a security level of the information processing device, wherein the driver is configured to be installed on the information processing device with such a default setting that the image forming device operates in the secure mode when the installation information of an-other information processing device indicates that the security level of the other information processing device is lower than the security level of the information processing device.

16. The method according to claim 10, wherein the information processing device is further installed with a status monitor when the driver is installed on the information processing device, the status monitor being configured to monitor a status about installation of the driver, the installation information of an-other information processing device being used as the indicative information and configured to be obtained from the status monitor installed on the other information processing device, the default setting being configured to be selected from one of the secure mode and the normal mode depending on the installation information of the other information processing device.

* * * * *